(12) United States Patent
Wang (10) Patent No.: US 12,223,153 B2
(45) Date of Patent: Feb. 11, 2025

(54) DISPLAY PANEL WITH SAME SHAPE OF GRID STRUCTURE OF TOUCH ELECTRODES, LEADS, DUMMY ELECTRODES AND MOBILE TERMINAL

(71) Applicant: WUHAN CHINA STAR OPTOELECTRONICS SEMICONDUCTOR DISPLAY TECHNOLOGY CO., LTD., Wuhan (CN)

(72) Inventor: Xing Wang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/599,524

(22) PCT Filed: Sep. 14, 2021

(86) PCT No.: PCT/CN2021/118252
§ 371 (c)(1),
(2) Date: Sep. 28, 2021

(87) PCT Pub. No.: WO2023/029088
PCT Pub. Date: Mar. 9, 2023

(65) Prior Publication Data
US 2024/0053856 A1    Feb. 15, 2024

(30) Foreign Application Priority Data
Aug. 30, 2021    (CN) .......................... 202111001116.3

(51) Int. Cl.
*G06F 3/045*    (2006.01)
*G06F 3/041*    (2006.01)
*G06F 3/044*    (2006.01)

(52) U.S. Cl.
CPC .......... *G06F 3/0448* (2019.05); *G06F 3/0412* (2013.01); *G06F 3/0443* (2019.05);
(Continued)

(58) Field of Classification Search
CPC .... G06F 3/0448; G06F 3/0446; G06F 3/0443; G06F 3/0412
(Continued)

(56) References Cited

U.S. PATENT DOCUMENTS

2016/0085339 A1* 3/2016 Yashiro ................. G06F 3/0445
345/174
2016/0202793 A1    7/2016 Kim et al.
(Continued)

FOREIGN PATENT DOCUMENTS

CN    104615322 A    5/2015
CN    105425992 A    3/2016
(Continued)

OTHER PUBLICATIONS

International Search Report in International application No. PCT/CN2021/118252, mailed on May 27, 2022.
(Continued)

*Primary Examiner* — Jonathan M Blancha
(74) *Attorney, Agent, or Firm* — PV IP PC; Wei Te Chung (57) ABSTRACT

A display panel and a mobile terminal are provided by the present disclosure, including a substrate and a conductive layer on the substrate. The conductive layer includes a plurality of touch electrodes, a plurality of leads, and a plurality of dummy electrodes, wherein each one of the leads (Continued)

is disposed between two adjacent ones of the touch electrodes, and each one of the dummy electrodes is disposed between one of the touch electrodes and one of the leads which are adjacent to each other. Each one of the leads is electrically connected between the corresponding touch electrode and a touch chip, and the dummy electrodes are electrically connected to neither the touch electrodes nor the leads. A shape of a grid structure of the touch electrodes, a shape of a grid structure of the leads, and a shape of a grid structure of the dummy electrodes are the same.

18 Claims, 5 Drawing Sheets

(52) U.S. Cl.
CPC .. *G06F 3/0446* (2019.05); *G06F 2203/04107* (2013.01); *G06F 2203/04111* (2013.01)

(58) Field of Classification Search
USPC .......................................................... 345/174
See application file for complete search history.

(56) References Cited

U.S. PATENT DOCUMENTS

| 2018/0246615 A1* | 8/2018 | Nakamura | G06F 3/0443 |
| 2019/0302936 A1* | 10/2019 | Clark | G06F 3/0412 |
| 2023/0031048 A1* | 2/2023 | Xiang | G06F 3/0446 |

FOREIGN PATENT DOCUMENTS

| CN | 110456943 A | 11/2019 |
| CN | 110471568 A | 11/2019 |
| CN | 111506218 A | 8/2020 |
| CN | 111651094 A | 9/2020 |
| CN | 111831172 A | 10/2020 |
| CN | 112198990 A | 1/2021 |
| CN | 113126822 A | 7/2021 |
| CN | 113296635 A | 8/2021 |

OTHER PUBLICATIONS

Written Opinion of the International Search Authority in International application No. PCT/CN2021/118252, mailed on May 27, 2022.
Chinese Office Action issued in corresponding Chinese Patent Application No. 202111001116.3 dated May 6, 2023, pp. 1-8.

* cited by examiner

DISPLAY PANEL WITH SAME SHAPE OF GRID STRUCTURE OF TOUCH ELECTRODES, LEADS, DUMMY ELECTRODES AND MOBILE TERMINAL

RELATED APPLICATIONS

This application is a Notional Phase of PCT Patent Application No. PCT/CN2021/118252 having international filing date of Sep. 14, 2021, which claims the benefit of priority of Chinese Patent Application No. 202111001116.3 filed on Aug. 30, 2021. The contents of the above applications are all incorporated by reference as if fully set forth herein in their entirety.

FIELD OF INVENTION

The present disclosure relates to the field of display technologies, and in particular to a display panel and mobile terminal.

BACKGROUND OF INVENTION

With development of technologies, smart devices such as mobile phones, tablet computers, digital cameras, and smart wearable products with touch functions have simplified human-computer interaction and brought high-quality user experiences to users. Touchscreens mainly include resistive touchscreens, capacitive touchscreens, infrared touchscreens, and surface acoustic wave touchscreens. The capacitive touchscreens are widely used in the above-mentioned smart devices due to fast response times, satisfactory reliability, and durability, etc.

In order to reduce costs and increase production capacity, single-layer metal self-capacitive touchscreens have become a new research direction. A metal touch layer of the single-layer metal self-capacitive touchscreens often adopts a grid-like layout. The metal touch layer includes a touch area, a lead area, and a shielding area, wherein the touch area includes a plurality of mutually insulated touch electrodes arranged in an array, the lead area includes a plurality of sets of leads, which are connected to the touch electrodes in one-to-one correspondence, and the shielding area is the other area of the metal touch layer excluding the touch area and the lead area. Since grid shapes of the touch area, the lead area, and the shield area are different from each other, reflective effects of the three are different, resulting in uneven brightness of screens, thereby affecting display effects.

SUMMARY OF INVENTION

Technical Problems

Embodiments of the present disclosure provide a display panel and a mobile terminal, so as to solve the problem of uneven brightness of existing display panels.

Technical Solutions

An embodiment of the present disclosure provides a display panel, comprising: a substrate and a conductive layer disposed on the substrate, wherein the conductive layer includes a plurality of touch electrodes, a plurality of leads, and a plurality of dummy electrodes, each one of the leads is disposed between two adjacent ones of the touch electrodes, each one of the dummy electrodes is disposed between one of the touch electrodes and one of the leads which are adjacent to each other, one end of each one of the leads is electrically connected to the corresponding touch electrode, and the other end is electrically connected to a touch chip, and the dummy electrodes are electrically connected to neither the touch electrodes nor the leads;

wherein the touch electrodes, the leads, and the dummy electrodes all include a grid structure of a same shape;

wherein the display panel further comprises a light-emitting layer disposed between the substrate and the conductive layer, and the light-emitting layer includes a plurality of light-emitting pixels;

wherein the grid structures of the touch electrodes, the leads, and the dummy electrodes include a plurality of grid bodies disposed around the corresponding light-emitting pixel; and further include at least one grid connection line configured to electrically connect to one of the grid bodies adjacent thereto, the grid structure of the touch electrodes and the grid structure of the leads further includes at least one grid connection line configured to electrically connect two adjacent ones of the grid bodies, and a shape of the grid bodies of the touch electrodes, a shape of the grid bodies of the leads, and a shape of the grid bodies of the dummy electrodes are the same; and wherein each one of the grid bodies includes at least one arc line segment structure.

In an embodiment, the plurality of grid bodies of the grid structures of the touch electrodes, the leads, and the dummy electrodes are arranged in a first direction and a second direction, and each one of the grid bodies includes two sub-grid bodies located on both sides of the corresponding light-emitting pixel; and wherein in the sub-grid bodies arranged in the second direction, the grid connection line is connected between two adjacent ones of the sub-grid bodies, and the sub-grid bodies and the grid connection line disposed alternately and continuously in the second direction are formed as a strip-shaped structure.

In an embodiment, in each one of the grid bodies, a disconnected structure is connected to one side of one of the sub-grid bodies away from the other sub-grid body.

In an embodiment, each one of the leads includes a horizontal sub-lead which extends in the first direction and is connected to the corresponding touch electrode, and the first direction is parallel to one side of the display panel close to the horizontal sub-lead; and wherein the horizontal sub-lead includes the sub-grid bodies electrically connected in the first direction.

In an embodiment, each one of the leads further includes a vertical sub-lead which extends in the second direction and is connected to the horizontal sub-lead, and the second direction is parallel to one side of the display panel close to the vertical sub-lead; and wherein the vertical sub-lead includes the strip-shaped structures arranged in the second direction, and two adjacent ones of the strip-shaped structures are electrically connected or insulated from each other.

In an embodiment, the touch electrodes include the strip-shaped structures arranged in the second direction.

In an embodiment, the touch electrodes include a plurality of lapping points, and each one of the lapping points is connected between two adjacent ones of the grid bodies in the touch electrodes, and the plurality of lapping points are evenly distributed.

In an embodiment, the touch electrodes include a backbone area which is located in the middle of the touch electrodes and extends in the first direction, and a contour formed by the plurality of lapping points in the backbone area is formed as a plurality of rhombus structures arranged in the first direction.

In an embodiment, the dummy electrodes include the strip-shaped structures arranged in the second direction, and the strip-shaped structures in the dummy electrodes are insulated from the touch electrodes and the leads.

An embodiment of the present disclosure provides a display panel, comprising: a substrate and a conductive layer disposed on the substrate, wherein the conductive layer includes a plurality of touch electrodes, a plurality of leads, and a plurality of dummy electrodes, each one of the leads is disposed between two adjacent ones of the touch electrodes, each one of the dummy electrodes is disposed between one of the touch electrodes and one of the leads which are adjacent to each other, one end of each one of the leads is electrically connected to the corresponding touch electrode, and the other end is electrically connected to a touch chip, and the dummy electrodes are electrically connected to neither the touch electrodes nor the leads;

wherein the touch electrodes, the leads, and the dummy electrodes all include a grid structure of a same shape.

In an embodiment, the display panel further comprises a light-emitting layer disposed between the substrate and the conductive layer, and the light-emitting layer includes a plurality of light-emitting pixels;

wherein the grid structures of the touch electrodes, the leads, and the dummy electrodes include a plurality of grid bodies disposed around the corresponding light-emitting pixel; and further include at least one grid connection line configured to electrically connect to one of the grid bodies adjacent thereto, the grid structure of the touch electrodes and the grid structure of the leads further includes at least one grid connection line configured to electrically connect two adjacent ones of the grid bodies, and shapes of the grid bodies of the touch electrodes, the grid bodies of the leads, and the grid bodies of the dummy electrodes are the same.

In an embodiment, the plurality of grid bodies of the grid structures of the touch electrodes, the leads, and the dummy electrodes are arranged in a first direction and a second direction, and each one of the grid bodies includes two sub-grid bodies located on both sides of the corresponding light-emitting pixel; and wherein in the sub-grid bodies arranged in the second direction, the grid connection line is connected between two adjacent ones of the sub-grid bodies, and the sub-grid bodies and the grid connection line disposed alternately and continuously in the second direction are formed as a strip-shaped structure.

In an embodiment, in each one of the grid bodies, a disconnected structure is connected to one side of one of the sub-grid bodies away from the other sub-grid body.

In an embodiment, each one of the leads includes a horizontal sub-lead which extends in the first direction and is connected to the corresponding touch electrode, and the first direction is parallel to one side of the display panel close to the horizontal sub-lead; and wherein the horizontal sub-lead includes the sub-grid bodies electrically connected in the first direction.

In an embodiment, each one of the leads further includes a vertical sub-lead which extends in the second direction and is connected to the horizontal sub-lead, and the second direction is parallel to one side of the display panel close to the vertical sub-lead; and wherein the vertical sub-lead includes the strip-shaped structures arranged in the second direction, and two adjacent ones of the strip-shaped structures are electrically connected or insulated from each other.

In an embodiment, the touch electrodes include the strip-shaped structures arranged in the second direction.

In an embodiment, the touch electrodes include a plurality of lapping points, and each one of the lapping points is connected between two adjacent ones of the grid bodies in the touch electrodes, and the plurality of lapping points are evenly distributed.

In an embodiment, the touch electrodes include a backbone area which is located in the middle of the touch electrodes and extends in the first direction, and a contour formed by the plurality of lapping points in the backbone area is formed as a plurality of rhombus structures arranged in the first direction.

In an embodiment, the dummy electrodes include the strip-shaped structures arranged in the second direction, and the strip-shaped structures in the dummy electrodes are insulated from the touch electrodes and the leads.

A mobile terminal, comprising: a terminal body and the display panel as mentioned above, wherein the terminal body and the display panel are combined into one body.

Beneficial Effect

The display panel and the mobile terminal provided by the embodiments of the present disclosure includes a substrate and a conductive layer disposed on the substrate, wherein the conductive layer includes the plurality of touch electrodes, the plurality of leads, and the plurality of dummy electrodes. Each one of the leads is disposed between two adjacent ones of the touch electrodes, and each one of the dummy electrodes is disposed between one of the touch electrodes and one of the leads which are adjacent to each other. One end of each one of the leads is electrically connected to the corresponding touch electrode and, the other end is electrically connected to a touch chip. The dummy electrodes are electrically connected to neither the touch electrodes nor the leads. The touch electrodes, the leads, and the dummy electrodes all include a grid structure of a same shape. In the present disclosure, the shapes of the grid structures of the touch electrodes, the leads, and the dummy electrodes are the same, so that reflective effects of the three are the same, which greatly prevents uneven brightness of screens, and improves display effects of display panels.

DESCRIPTION OF DRAWINGS

The technical solutions and other beneficial effects of the present disclosure are obvious by specific embodiments of the present disclosure described in detail below in combination with attached drawings.

DETAILED DESCRIPTION OF PREFERRED EMBODIMENTS

The technical solutions in the embodiments of the present disclosure are clearly and completely described below in combination with the attached drawings in the embodiments of the present disclosure. Obviously, the described embodiments are part of the embodiments of the present disclosure, rather than all of the embodiments. Based on the embodiments of the present disclosure, all other embodiments obtained by those of ordinary skill in the art without creative work shall fall within protection scopes of the present disclosure.

The embodiments of the present disclosure provide a new display panel and a mobile terminal to solve problems relating that grid shapes of touch areas, lead areas and shielding areas of metal touch layers of single-layer metal self-capacitive touchscreens in the prior art are different from each other, resulting in uneven brightness of screens.

Figure 1:
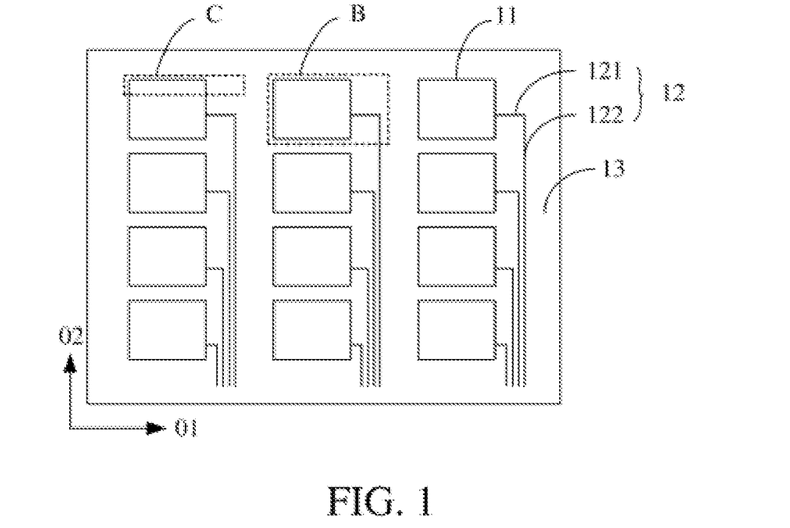
FIG. 1 is a schematic structural diagram of overall structure of a conductive layer provided by an embodiment of the present disclosure.

Please refer to FIG. 1. FIG. 1 is a top view of a display panel provided by an embodiment of the present disclosure. In an embodiment, the display panel provided by the embodiment of the present disclosure includes a substrate and a conductive layer disposed on the substrate. The conductive layer includes a plurality of touch electrodes 11, a plurality of leads 12, and a plurality of dummy electrode 13. Each one of the leads 12 is disposed between two adjacent ones of the touch electrodes 11, and each one of the dummy electrodes 13 is disposed between one of the touch electrodes 11 and one of the leads 12 which are adjacent to each other. One end of each one of the leads 12 is electrically connected to the corresponding touch electrode 11, and the other end is electrically connected to a touch chip. The dummy electrodes 13 are electrically connected to neither the touch electrodes 11 nor the leads 12. The touch electrodes 11, the leads 12, and the dummy electrodes 13 all include a grid structure of a same shape.

The plurality of touch electrodes 11 are formed as a touch area, and the plurality of touch electrodes 11 are disposed on the substrate in the same layer and insulated from each other. Preferably, the plurality of touch electrodes 11 are disposed on the substrate in an array. The plurality of touch electrodes 11 may have the same shape and size. The plurality of leads 12 are formed as a lead area, and the leads 12 are individually connected to the corresponding touch electrodes 11 in one-to-one correspondence. Specifically, one end of each one of the leads 12 is connected to the corresponding touch electrode 11, and the other end is connected to a touch detection module (not shown in FIG. 1), so as to realize touch detection. Specifically, the display panel is provided with a plurality of touch electrodes 11 in the same layer and insulated from each other. As the screen is not touched by human body parts, capacitance that each touch electrode 11 bears is a fixed capacitance. As the screen is touched by human body parts, the capacitance that the corresponding touch electrode 11 bears is a fixed capacitance plus a human body capacitance. The touch detection module determines touch positions by monitoring changes in the capacitance values of all the touch electrodes 11 during touch period. The dummy electrodes 13 are filled in an area outside the plurality of touch electrodes 11 and the plurality of leads 12, so as to form a dummy area.

It can be understood that in the present embodiment, the shapes of the grid structures of the touch electrodes 11, the leads 12, and the dummy electrodes 13 filled between the touch electrodes 11 and the leads 12 are configured to be the same, so that reflective effects of the three are the same. That is, the reflective effects of all parts in the entire display area of the display panel are equivalent, thereby greatly preventing uneven brightness of the screen, and improving display effects of the display panel.

Figure 2:
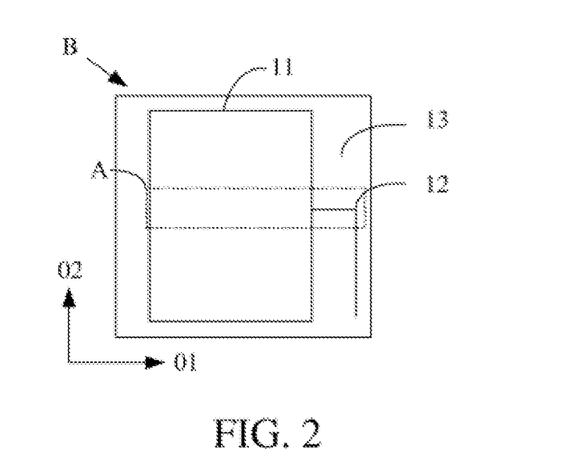
FIG. 2 is a schematic structural diagram of a region near touch electrodes provided by an embodiment of the present disclosure.
Figure 3:
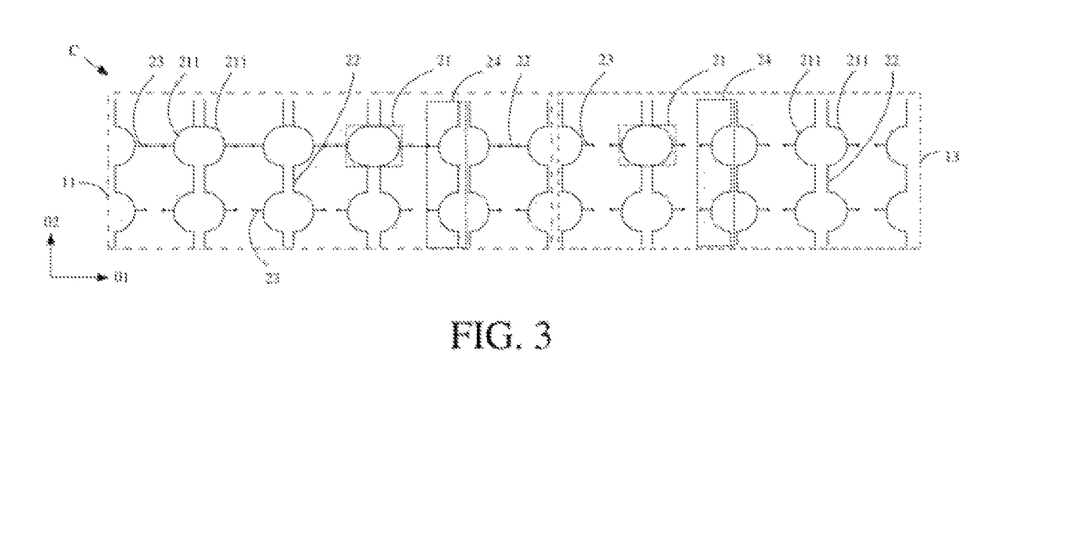
FIG. 3 is a partial enlarged schematic diagram of a conductive layer provided by an embodiment of the present disclosure.
Figure 4:
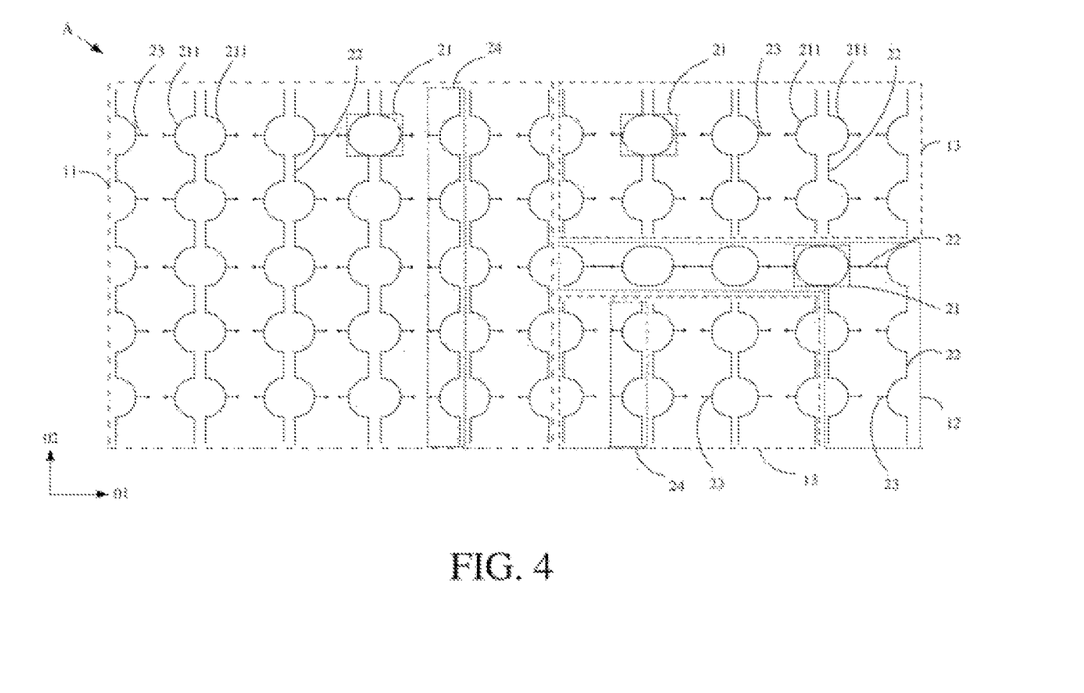
FIG. 4 is an another partially enlarged schematic diagram of a conductive layer provided by an embodiment of the present disclosure.
Figure 5:
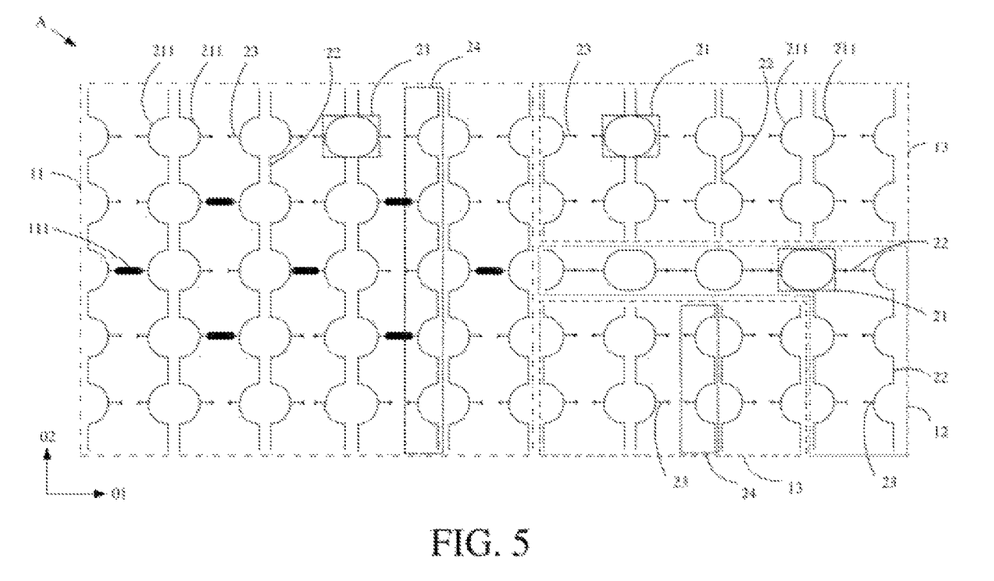
FIG. 5 is a further another partial enlarged schematic diagram of a conductive layer provided by an embodiment of the present disclosure.

In an embodiment, refer to FIGS. 1 to 5. FIG. 2 is an enlarged schematic view of an area B in FIG. 1. FIG. 3 is an enlarged schematic view of an area C in FIG. 1. Both FIGS. 4 and 5 are enlarged schematic views of an area A in FIG. 2. The display panel further includes a light-emitting layer disposed between the substrate and the conductive layer, the light-emitting layer includes a plurality of light-emitting pixels, and the grid structure is disposed corresponding to the light-emitting pixels. As shown in FIGS. 3 to 5, the grid structures of the touch electrodes 11, the leads 12, and the dummy electrodes 13 all include a plurality of grid bodies 21 disposed around the corresponding light-emitting pixels. The grid structures of the touch electrodes 11 and the leads 12 further includes at least one grid connection line 22 configured to electrically connect two adjacent ones of the grid bodies 21, and a shape of the grid bodies 21 of the touch electrodes 11, a shape of the grid bodies 21 of the leads 12, and a shape of the grid bodies 21 of the dummy electrodes 13 are the same.

It can be understood that for network structure of any one of the touch electrodes 11, the leads 12, and the dummy electrodes 13, the grid bodies 21 are in one-to-one correspondence to the light-emitting pixels. Moreover, a projection of each one of the grid bodies 21 projected on the light-emitting layer surrounds the corresponding light-emitting pixel, so as to prevent blocking the corresponding light-emitting pixel. Further, for the network structure of any one of the touch electrodes 11 and the leads 12, a grid connection line 22 is provided between at least two adjacent ones of the grid bodies 21, so as to electrically connect the two adjacent grids bodies 21, thereby realizing transmission of electric signals.

In one embodiment, as shown in FIGS. 3 to 5, the grid bodies 21 in the grid structure of the touch electrodes 11, the leads 12, and the dummy electrodes 13 are arranged in a first direction 01 and a second direction 02. Each one of the grid bodies 21 includes two sub-grid bodies 211 located on both sides of the corresponding light-emitting pixel. In the sub-grid bodies 211 arranged in the second direction 02, the grid connection line 22 is connected between two adjacent ones of the sub-grid bodies 211, and the sub-grid bodies 211 and the grid connection line 22 disposed alternately and continuously in the second direction are formed as a strip-shaped structure 24.

Specifically, the display panel may be rectangular, wherein the first direction 01 may be parallel to a first side of the display panel, the second direction 02 may be parallel to a second side of the display panel, and the first side and the second side are adjacent to each other. Further, the first side may be perpendicular to the second side, as shown in FIGS. 3 to 5. That is, the grid bodies 21 may be arranged in a matrix. It can be understood that in the second direction 02, the two adjacent sub-grid bodies 21 are electrically connected by the grid connection line 22, so that the corresponding strip structure 24 can transmit electrical signals. According to the above analysis, it can be seen that the two strip-shaped structures 24 of the light-emitting pixels in the same column are arranged axisymmetrically.

In an embodiment, as shown in FIGS. 3 to 5, in the grid bodies 21, a disconnected structure 23 is connected to one side of one of the sub-grid bodies 211 away from the other sub-grid body 211. Specifically, for the dummy electrodes 13, two adjacent ones of the disconnected structures 23 may be electrically connected or electrically disconnected. For the touch electrodes 11 and the leads 12, at least two adjacent ones of the disconnected structures 23 are electrically connected to form the grid connection line 22. Further, at least two adjacent ones of the disconnected structures 23 between two adjacent ones of the strip-shaped structures 24 are electrically connected to form the grid connection line 22, which are conducive to realize conduction of the grid structures in the first direction 01.

Figure 6:
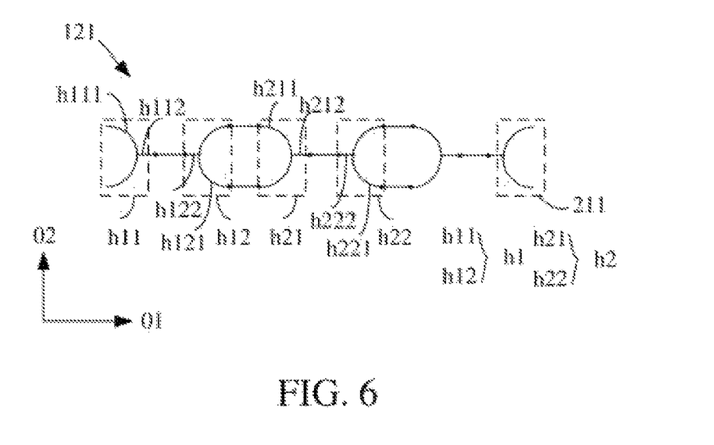
FIG. 6 is a schematic structural diagram of a horizontal sub-lead provided by an embodiment of the present disclosure.

Refer to FIGS. 4 to 6. In an embodiment, each one of the leads 12 includes a horizontal sub-lead 121 which extends in the first direction 01 and is connected to the corresponding touch electrode 11. The first direction 01 is parallel to one side of the display panel close to the horizontal sub-lead 121. The horizontal sub-lead 121 includes the sub-grid bodies 211 electrically connected in the first direction 01.

Refer to FIG. 4. The area A includes a partial area of the touch electrodes 11 (i.e., a backbone area of the touch electrodes 11 in the embodiment of the present disclosure, i.e., a middle area), a partial area of the leads 12, and a partial area of the dummy electrodes 13. As shown in FIGS. 4 and 6, the horizontal sub-lead 121 includes a plurality of the sub-grid bodies 211 electrically connected in the first direction 01. Specifically, in combination with the above discussion, it can be seen that the horizontal sub-lead 121 includes a plurality of grid bodies 21 arranged in the first direction 01 as described above, and each one of the grid bodies 21 includes two sub-grids bodies 211 disposed opposite to each other. Further, the sub-grid bodies 211 may have an arc line segment structure. Further, the two arc line segment structures in the same grid body 21 may be electrically connected. Specifically, top ends of the two arc line segment structures in the same grid body 21 are connected to each other, and bottom ends of the two arc line segment structures in the same grid body 21 are also connected to each other, so as to realize conduction of the horizontal sub-lead 121 in the first direction 01.

Specifically, please refer to FIG. 6. FIG. 6 is a schematic structural diagram of the horizontal sub-lead 121 provided by an embodiment of the present disclosure. The horizontal sub-lead 121 as shown in FIG. 3 includes the plurality of sub-grid bodies 211 arranged along the first direction 01. In the first direction 01, the horizontal sub-lead 121 as shown in FIG. 6 may sequentially include a first group of arc line segment structures h1, a second group of arc line segment structures h2, and so on. The first group of arc line segment structures h1 includes an arc line segment structure h11 and an arc line segment structure h12, wherein the arc line segment structure h11 includes an arc line segment h111 and a disconnected structure h112, and the arc line segment structure h12 includes an arc line segment h121 and a disconnected structure h122. The disconnected structure h112 is disposed opposite the disconnected structure h122. The second group of arc line segment structure h2 includes an arc line segment structure h21 and an arc line segment structure h22, wherein the arc line segment structure h21 includes an arc line segment h211 and a disconnected structure h212, and the arc line segment structure h22 includes an arc line segment h221 and a disconnected structure h222. The disconnected structure h212 is disposed opposite the disconnected structure h222. The disconnected structure h112 in the arc line segment structure h11 and the disconnected structure h122 in the arc line segment structure h12 are connected. The disconnected structure h212 in the arc line segment structure h21 is disposed opposite the disconnected structure h222 in the arc line segment structure h22. The disconnected structure h212 in the arc line segment structure h21 and the disconnected structure h222 in the arc line segment structure h22 are connected. A top end of the arc line segment h121 in the arc line segment structure h12 and a top end of the arc line segment h211 in the arc line segment structure h21 are connected, and a bottom end of the arc line segment h121 in the arc line segment structure h12 and a bottom end of the arc line segment h211 in the arc line segment structure h21 are connected. Any one of the arc line segments can be understood as the sub-grid body 211 described above, and any one of the disconnected structures can be understood as the disconnected structure 23 described above.

In an embodiment, as shown in FIGS. 3 to 5 and FIG. 7, each one of the leads 12 further includes a vertical sub-lead 122 extending in the second direction 02 and connected to the horizontal sub-lead 121. The second direction 02 is parallel to one side of the display panel close to the vertical sub-lead 122. The vertical sub-lead 122 includes the strip-shaped structures 24 arranged in the second direction 02, and two adjacent ones of the strip-shaped structures 24 are electrically connected or insulated from each other.

Figure 7:
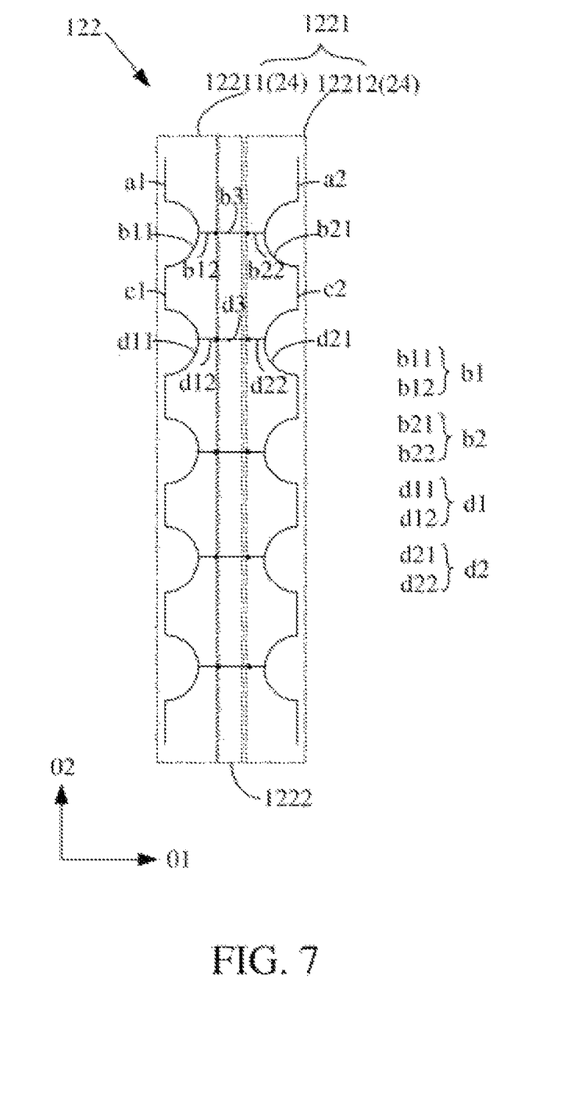
FIG. 7 is a schematic structural diagram of a vertical sub-lead provided by an embodiment of the present disclosure.

Please refer to FIG. 7. FIG. 7 is a schematic structural diagram of the vertical sub-lead provided by an embodiment of the present disclosure. The vertical sub-lead 122 includes a first wiring structure 1221 and a second wiring structure 1222. The first wiring structure 1221 includes two strip-shaped structures 24 disposed opposite each other, and two ends of the second wiring structure 1222 are individually connected to two of the sub-grid bodies 211 disposed opposite each other. The two strip structures 24 in the first wiring structure 1221 are respectively a first metal wire 12211 disposed to the left and a second metal wire 12212 disposed to the right, wherein the first metal wire 12211 may extend in the second direction 02, and the second metal wire 12212 may also extend in the second direction 02. The first metal wire 12211 and the second metal wire 12212 are disposed axisymmetrically, and the two ends of the second metal structure 1222 are individually connected to the first metal wire 12211 and the second metal wire 12212. Certainly, the number of the strip structures 24 and the corresponding second wiring structure 1222 in the vertical sub-lead 122 are not limited herein.

Specifically, as shown in FIG. 7, the first metal wire 12211 and the second metal wire 12212 may include a plurality of straight line segment structures and a plurality of arc line segment structures, which are alternately arranged. Each one of the arc line segment structures in the first metal wire 12211 includes an arc line segment and a disconnected structure disposed on one side of the arc line segment close to the second metal wire 12212. The straight line segment structures in the first metal wire 12211 and the straight line segment structures in the second metal wire 12212 are disposed opposite to each other, and the arc line segment structures in the first metal wire 12211 and the arc line segment structures in the second metal wire 12212 are disposed opposite each other. The second wiring structure 1222 may include a plurality of connecting lines, each of which is individually connected between the two disconnected structures in the two arc line segment structures disposed opposite each other. Any one of the arc line segments can be understood as the grid body 21 described above, any one of the disconnected structures can be understood as the disconnected structure 23 described above, and any one of the straight line segment structures can be understood as the grid connection line 22 described above.

Further, please continue to refer to FIG. 7. The plurality of straight line segment structures and the plurality of arc line segment structures alternately arranged in the first metal wire 12211 can be sequentially arranged as a straight line segment structure a1, an arc line segment structure b1, a straight line segment structure c1, an arc line segment structure d1, and so on. The arc line segment structure b1 includes an arc line segment b11 and a disconnected structure b12 disposed on one side of the arc line segment b11 close to the second metal wire 12212. The arc line segment structure d1 includes an arc line segment d11 and a disconnected structure d12 disposed on one side of the arc line segment d11 close to the second metal wire 12212. Similarly, the plurality of straight line segment structures and the plurality of arc line segment structures alternately arranged in the second metal wire 12212 may be arranged in sequence as a straight line segment structure a2, an arc line segment structure b2, a straight line segment structure c2, an arc line segment structure d2, and so on. The arc line segment structure b2 includes an arc line segment b21 and a disconnected structure b22 disposed on one side of the arc line segment b21 close to the first metal wire 12211. The arc line segment structure d2 includes an arc line segment d21 and a disconnected structure d22 disposed on one side of the arc line segment d21 close to the first metal wire 12211. The straight line segment structure a1 is disposed opposite the straight line segment structure a2, the arc line segment structure b1 is disposed opposite the arc line segment structure b2, the straight line segment structure c1 is disposed opposite the straight line segment structure c2, the arc-line segment structure d1 is disposed opposite the arc line segment structure d2, and so on. The plurality of connecting lines provided by the second wiring structure 1222 are respectively a connecting line b3, a connecting line d3, and so on. Two ends of the connecting line b3 are individually connected to the disconnected line structure b12 in the arc line segment structure b1 and the disconnected structure b22 in the arc line segment structure b2. Two ends of the connecting line d3 are individually connected to the disconnected structure d12 in the arc line segment structure d1 and the disconnected structure d22 in the arc line segment structure d2.

It should be noted that the straight line segment structures and the arc line segment structures alternately arranged in the first metal wire 12211 may be sequentially arranged as an arc line segment structure, a straight line segment structure, an arc line segment structure, a straight line segment structure, and so on. Correspondingly, the straight line segment structures and the arc line segment structures alternately arranged in the second metal wire 12212 may be sequentially arranged as an arc line segment structure, a straight line segment structure, an arc line segment structure, a straight line segment structure, and so on. In summary, whether initial segments of the first metal wire 12211 and the second metal wire 12212 are a straight line segment structure, or an arc line segment structure are not specifically limited by the embodiment of the present disclosure. Similarly, whether ending segments of the first metal wire 12211 and the second metal wire 12212 are a straight line segment structure or an arc line segment structure are further not specifically limited by the embodiment of the present disclosure.

Figure 8:
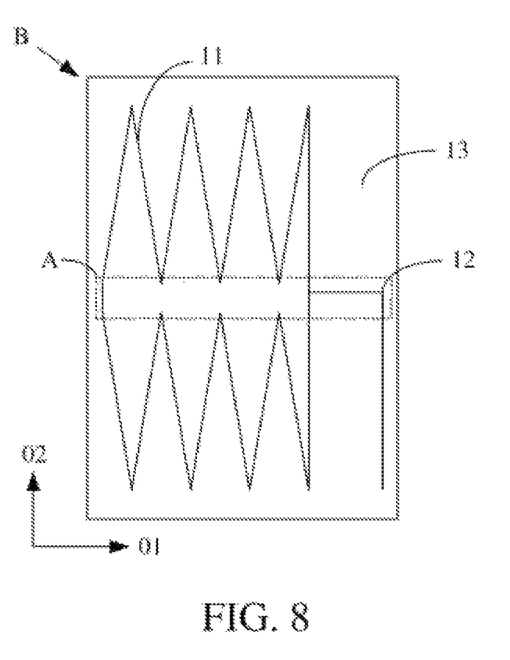
FIG. 8 is a schematic structural diagram of an area near another touch electrodes provided by an embodiment of the present disclosure.

In an embodiment, as shown in FIGS. 4 to 5, the touch electrodes 11 includes the strip-shaped structures 24 arranged in the second direction 02. Only a complete touch electrode 11, of which an upper edge and a lower edge are in a zigzag shape, is schematically shown in FIG. 8. Only a complete touch electrode 11, which is rectangular, is schematically shown in FIG. 2. It is understandable that in the second direction 02, each one of the connected strip-shaped structures 24 transmits electrical signals. Specifically, refer to FIG. 7 for related description herein. Further, according to the above discussion, it can be seen that for the touch electrodes 11, at least two adjacent ones of the disconnected structures 23 are electrically connected to form a grid connection line 22. Further, at least two adjacent ones of the disconnected structures 23 are electrically connected between the two strip-shaped structures 24 to form a grid connection line 22, which are conducive to realize conduction of the grid structures in the first direction 01.

Refer to FIG. 5. In an embodiment, the touch electrodes 11 include a plurality of lapping points 111, and each one of the lapping points 111 is connected between two adjacent ones of the grid bodies 21 in the touch electrodes 11, and the plurality of lapping points 111 are evenly distributed.

Specifically, as shown in FIG. 7, two ones of the disconnected structures 23 arranged opposite each other in the touch electrodes 11 can be connected by each one of the lapping points 111. It can be understood that by providing the lapping points 111 in the touch electrodes 11 to electrically connect two ones of the sub-grid bodies 211 which are arranged opposite to each other in the touch electrodes 11, resistance of the touch electrodes 11 can be reduced, thereby allowing current to be conducted divergently. Further, it can be clearly seen that the lapping points 111 in the touch electrodes 11 are evenly distributed. It is understandable that centralized arrangement of the lapping points 111 in the touch electrodes 11 causes obviously different metal densities of different areas in the touch electrodes 11, which leads to uneven brightness of screens generally. Therefore, in the embodiment of the present disclosure, the lapping points 111 are uniformly disposed in the touch electrodes 11, so that the lapping points 111 are evenly distributed in a dispersed state, which can prevent uneven brightness of screens and improve display effects.

In an embodiment, as shown in FIGS. 2, 8, and 5, the touch electrodes 11 includes a backbone area located in the middle of the touch electrodes 11 and extending in the first direction 01. A contour formed by the lapping points 111 in the backbone area is formed as a plurality of rhombus structures arranged in the first direction 01.

It is understandable that in a case that the contour formed by the lapping points 111 in the backbone area of the touch electrodes 11 is formed as the rhombus structures arranged in the first direction 01, the lapping points 111 are dispersedly distributed in the backbone area of the touch electrodes 11, which can further reduce resistance of the touch electrodes 11 and allow current to be conducted divergently. It should be noted that, in other embodiments, the contour formed by the lapping points 111 in the backbone area of the touch electrodes 11 may further be formed into a plurality of structures of other shapes arranged in the first direction 01, such as a circular shape, a square shape, etc., which is not specifically limited by the embodiments of the present disclosure. Further, the touch electrodes 11 further includes a plurality of edge areas located on both sides of the backbone area, and the lapping points 111 in the touch electrodes 11 are further located in the edge areas. It is understandable that by providing the lapping points 111 in both the backbone area and the edge areas of the touch electrodes 11, the lapping points 111 are connected between two adjacent ones of the grid bodies 21 in the touch electrodes 11, so that multiple lapping points 111 can be dispersedly distributed in the touch electrodes 11, thereby further reducing resistance of the touch electrodes 11 and allowing current to be conducted divergently.

In an embodiment, as shown in FIGS. 3 to 5, the dummy electrodes 13 includes the strip-shaped structures 24 arranged in the second direction 02, and the strip-shaped structures 24 in the dummy electrodes are insulated from the touch electrodes 11 and the leads 12. Specifically, when the disconnected structures 23 in the strip-shaped structures 24 close to the touch electrodes 11 in the dummy electrodes 13 are far away from the touch electrodes 11, blocking for the touch electrodes 11 can be achieved by the opening of the arc line segment structure. When the disconnected structures 23 in the strip-shaped structure 24 close to the touch electrodes 11 in the dummy electrodes 13 are close to the touch electrodes 11, blocking for the touch electrodes 11 can be achieved by the end of the disconnected structure 23. In the same way, the dummy electrodes 13 can be blocked from the leads 12 by the end of the grid connection line 22, or can be blocked from the leads 12 by the upper top or lower top of the sub-grid body 211. It is understandable that the strip-shaped structures 24 in the dummy electrodes 13 are insulated from the touch electrodes 11 and the leads 12, which can prevent affecting touch detection effect.

Based on the same inventive concept, an embodiment of the present disclosure further provides a mobile terminal, including the above-mentioned display panel provided by the embodiments of the present disclosure. The mobile terminal can be any product or component with a display function, such as mobile phones, tablet computers, televisions, displays, notebook computers, digital photo frames, navigators, and so on. Principle of the mobile terminal to solve the problem is similar to that of the aforementioned display panel. Therefore, implementation of the mobile terminal may refer to the implementation of the aforementioned display panel, which is not repeated herein.

Based on the same inventive concept, an embodiment of the present disclosure further provides a method of manufacturing the above-mentioned display device. Specifically, the method includes the following steps.

First, a thin film transistor array layer is manufactured on a substrate, an organic light-emitting layer is manufactured on the thin film transistor layer, and an encapsulation layer is manufactured on the organic light-emitting layer. Then, metal material is deposited on the encapsulation layer, and a conductive layer is formed by sequentially applying photoresist, exposing, developing, etching, and removing photoresist. The conductive layer includes a plurality of touch electrodes, a plurality of leads, and a plurality of dummy electrodes, wherein each one of the leads is disposed between two adjacent ones of the touch electrodes, each one of the dummy electrodes is disposed between one of the touch electrodes and one of the leads which are adjacent to each other, one end of each one of the leads is electrically connected to the corresponding touch electrode, and the other end is electrically connected to a touch chip, and the dummy electrodes are electrically connected to neither the touch electrodes nor the leads. The touch electrodes, the leads, and the dummy electrodes all include a grid structure of a same shape. It is understandable that since the grid shapes of the touch electrodes, the leads, and the dummy electrodes are the same, i.e., reflective effects of which are the same, thereby greatly preventing uneven brightness of screens, and improving display effects of display panels. It should be noted that, in order to protect the conductive layer, organic material may further be used to manufacture a protective layer on the conductive layer.

The display panel and the mobile terminal provided by the present disclosure includes a substrate and a conductive layer disposed on the substrate, wherein the conductive layer includes the plurality of touch electrodes, the plurality of leads, and the plurality of dummy electrodes. Each one of the leads is disposed between two adjacent ones of the touch electrodes, and each one of the dummy electrodes is disposed between one of the touch electrodes and one of the leads which are adjacent to each other. One end of each one of the leads is electrically connected to the corresponding touch electrode, and the other end is electrically connected to a touch chip. The dummy electrodes are electrically connected to neither the touch electrodes nor the leads. The touch electrodes, the leads, and the dummy electrodes all include a grid structure of a same shape. In the present disclosure, the shapes of the grid structures of the touch electrodes, the leads, and the dummy electrodes are the same, so that reflective effects of the three are the same, which greatly prevents uneven brightness of screens, and improves display effects of display panels.

Finally, it should be illustrated that the above embodiments are merely exemplary, and are not intended to limit the claims. Although the embodiments have been illustrated in detail, those of ordinary skill in the art should understand that modifications can still be made to the technical solutions recited in various embodiments described above, or equivalent substitutions can still be made to a part of technical features thereof, and these modifications or substitutions will not make the essence of the corresponding technical solutions depart from the spirit and scope of the claims.

What is claimed is:

1. A display panel, comprising: a substrate and a conductive layer disposed on the substrate, wherein the conductive layer includes a plurality of touch electrodes, a plurality of leads, and a plurality of dummy electrodes, each one of the leads is disposed between two adjacent ones of the touch electrodes, each one of the dummy electrodes is disposed between one of the touch electrodes and one of the leads which are adjacent to each other, one end of each one of the leads is electrically connected to the corresponding touch electrode, and the other end is electrically connected to a touch chip, and the dummy electrodes are electrically connected to neither the touch electrodes nor the leads;

wherein the touch electrodes, the leads, and the dummy electrodes all include a grid structure of a same shape;

wherein the display panel further comprises a light-emitting layer disposed between the substrate and the conductive layer, and the light-emitting layer includes a plurality of light-emitting pixels;

wherein the grid structures of the touch electrodes, the leads, and the dummy electrodes include a plurality of grid bodies disposed around the corresponding light-emitting pixel; and further include at least one grid connection line configured to electrically connect to one of the grid bodies adjacent thereto, the grid structure of the touch electrodes and the grid structure of the leads further includes at least one grid connection line configured to electrically connect two adjacent ones of the grid bodies, and a shape of the grid bodies of the touch electrodes, a shape of the grid bodies of the leads, and a shape of the grid bodies of the dummy electrodes are the same;

wherein each one of the grid bodies includes at least one arc line segment structure; and wherein the touch electrodes include a plurality of lapping points, and each one of the lapping points is connected between two adjacent ones of the grid bodies in the touch electrodes, and the plurality of lapping points are evenly distributed.

2. The display panel of claim 1, wherein the plurality of grid bodies of the grid structures of the touch electrodes, the leads, and the dummy electrodes are arranged in a first direction and a second direction, and each one of the grid bodies includes two sub-grid bodies located on both sides of the corresponding light-emitting pixel; and wherein in the sub-grid bodies arranged in the second direction, the grid connection line is connected between two adjacent ones of the sub-grid bodies, and the sub-grid bodies and the grid connection line disposed alternately and continuously in the second direction are formed as a strip-shaped structure.

3. The display panel of claim 2, wherein in each one of the grid bodies, a disconnected structure is connected to one side of one of the sub-grid bodies away from the other sub-grid body.

4. The display panel of claim 2, wherein each one of the leads includes a horizontal sub-lead which extends in the first direction and is connected to the corresponding touch electrode, and the first direction is parallel to one side of the display panel close to the horizontal sub-lead; and wherein the horizontal sub-lead includes the sub-grid bodies electrically connected in the first direction.

5. The display panel of claim 4, wherein each one of the leads further includes a vertical sub-lead which extends in the second direction and is connected to the horizontal sub-lead, and the second direction is parallel to one side of the display panel close to the vertical sub-lead; and wherein the vertical sub-lead includes the strip-shaped structures arranged in the second direction, and two adjacent ones of the strip-shaped structures are electrically connected or insulated from each other.

6. The display panel of claim 2, wherein the touch electrodes include the strip-shaped structures arranged in the second direction.

7. The display panel of claim 2, wherein the dummy electrodes include the strip-shaped structures arranged in the second direction, and the strip-shaped structures in the dummy electrodes are insulated from the touch electrodes and the leads.

8. The display panel of claim 1, wherein the touch electrodes include a backbone area which is located in the middle of the touch electrodes and extends in the first direction, and a contour formed by the plurality of lapping points in the backbone area is formed as a plurality of rhombus structures arranged in the first direction.

9. A display panel, comprising: a substrate and a conductive layer disposed on the substrate, wherein the conductive layer includes a plurality of touch electrodes, a plurality of leads, and a plurality of dummy electrodes, each one of the leads is disposed between two adjacent ones of the touch electrodes, each one of the dummy electrodes is disposed between one of the touch electrodes and one of the leads which are adjacent to each other, one end of each one of the leads is electrically connected to the corresponding touch electrode, and the other end is electrically connected to a touch chip, and the dummy electrodes are electrically connected to neither the touch electrodes nor the leads;

wherein the touch electrodes, the leads, and the dummy electrodes all include a grid structure of a same shape;

wherein the grid structures of the touch electrodes, the leads, and the dummy electrodes include a plurality of grid bodies disposed around the corresponding light-emitting pixel; and wherein the touch electrodes include a plurality of lapping points, and each one of the lapping points is connected between two adjacent ones of the grid bodies in the touch electrodes, and the plurality of lapping points are evenly distributed.

10. The display panel of claim 9, wherein the display panel further comprises a light-emitting layer disposed between the substrate and the conductive layer, and the light-emitting layer includes a plurality of light-emitting pixels;

wherein the grid structures of the touch electrodes, the leads, and the dummy electrodes further include at least one grid connection line configured to electrically connect to one of the grid bodies adjacent thereto, the grid structure of the touch electrodes and the grid structure of the leads further includes at least one grid connection line configured to electrically connect two adjacent ones of the grid bodies, and shapes of the grid bodies of the touch electrodes, the grid bodies of the leads, and the grid bodies of the dummy electrodes are the same.

11. The display panel of claim 10, wherein the plurality of grid bodies of the grid structures of the touch electrodes, the leads, and the dummy electrodes are arranged in a first direction and a second direction, and each one of the grid bodies includes two sub-grid bodies located on both sides of the corresponding light-emitting pixel; and wherein in the sub-grid bodies arranged in the second direction, the grid connection line is connected between two adjacent ones of the sub-grid bodies, and the sub-grid bodies and the grid connection line disposed alternately and continuously in the second direction are formed as a strip-shaped structure.

12. The display panel of claim 11, wherein in each one of the grid bodies, a disconnected structure is connected to one side of one of the sub-grid bodies away from the other sub-grid body.

13. The display panel of claim 11, wherein each one of the leads includes a horizontal sub-lead which extends in the first direction and is connected to the corresponding touch electrode, and the first direction is parallel to one side of the display panel close to the horizontal sub-lead; and wherein the horizontal sub-lead includes the sub-grid bodies electrically connected in the first direction.

14. The display panel of claim 13, wherein each one of the leads further includes a vertical sub-lead which extends in the second direction and is connected to the horizontal sub-lead, and the second direction is parallel to one side of the display panel close to the vertical sub-lead; and wherein the vertical sub-lead includes the strip-shaped structures arranged in the second direction, and two adjacent ones of the strip-shaped structures are electrically connected or insulated from each other.

15. The display panel of claim 11, wherein the touch electrodes include the strip-shaped structures arranged in the second direction.

16. The display panel of claim 11, wherein the dummy electrodes include the strip-shaped structures arranged in the second direction, and the strip-shaped structures in the dummy electrodes are insulated from the touch electrodes and the leads.

17. The display panel of claim 9, wherein the touch electrodes include a backbone area which is located in the middle of the touch electrodes and extends in the first direction, and a contour formed by the plurality of lapping points in the backbone area is formed as a plurality of rhombus structures arranged in the first direction.

18. A mobile terminal, comprising: a terminal body and the display panel of claim 9, wherein the terminal body and the display panel are combined into one body.

* * * * *